(12) United States Patent
Sandin et al.

(10) Patent No.: US 11,319,004 B2
(45) Date of Patent: May 3, 2022

(54) TRACKED VEHICLE

(71) Applicant: BAE Systems Hägglunds Aktiebolag, Örnsköldsvik (SE)

(72) Inventors: Anders Sandin, Örnsköldsvik (SE); Jonny Ljung, Örnsköldsvik (SE); Ulf Wiberg, Arnäsvall (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 408 days.

(21) Appl. No.: 16/493,257

(22) PCT Filed: Feb. 26, 2018

(86) PCT No.: PCT/SE2018/050179
§ 371 (c)(1),
(2) Date: Sep. 11, 2019

(87) PCT Pub. No.: WO2018/169465
PCT Pub. Date: Sep. 20, 2018

(65) Prior Publication Data
US 2020/0114991 A1    Apr. 16, 2020

(30) Foreign Application Priority Data
Mar. 16, 2017  (SE) .................................. 1750316-0

(51) Int. Cl.
*B62D 55/108*   (2006.01)
*B60G 11/08*   (2006.01)

(52) U.S. Cl.
CPC ............ *B62D 55/108* (2013.01); *B60G 11/08* (2013.01); *B60G 2202/114* (2013.01);
(Continued)

(58) Field of Classification Search
CPC .. B62D 55/108; B62D 55/1083; B60G 11/08; B60G 2202/114; B60G 2206/428; B60G 2206/72; B60G 2300/32
See application file for complete search history.

(56) References Cited

U.S. PATENT DOCUMENTS 6,155,363 A * 12/2000 Matsumoto .............. B60K 5/00
                                                                 180/180
6,394,204 B1   5/2002 Haringer
(Continued)

FOREIGN PATENT DOCUMENTS

CA          1059566 A      7/1979
CN        104670352 A      3/2015
(Continued)

OTHER PUBLICATIONS

Extended European Search Report received for European Application No. 18766663.1, dated Dec. 14, 2020, 5 pages.
(Continued)

*Primary Examiner* — Paul N Dickson
*Assistant Examiner* — Caitlin Anne Miller
(74) *Attorney, Agent, or Firm* — Morrison and Foerster LLP

(57) ABSTRACT

The invention relates to a tracked vehicle (V1, V2) comprising a vehicle body (20; 120), at least one track assembly (10) and a suspension device (S). Said track assembly (10) is arranged to be supported by said vehicle body (20; 120) by means of said suspension device (S). Said track assembly comprises a track support beam (12) for supporting a plurality of road wheels (16), an endless track (14) being disposed around said road wheels. Said suspension device (S) comprises a leaf spring arrangement (30; 130, 142, 144) having portions transversally arranged relative to the longitudinal extension of the vehicle. Said leaf spring arrangement comprises L-shaped leaf spring members (30; 130),
(Continued)

each leaf spring member (30; 130) having a first portion (32; 132) attached to said vehicle body (20; 120), a second portion (34; 134) attached to said track support beam (12) and a transition portion (36; 136) there between, so that compressive and tensile stresses are located to said transition portion (36; 136) for generating a compressive action in said transition portion.

7 Claims, 3 Drawing Sheets

(52) U.S. Cl.
CPC .... *B60G 2206/428* (2013.01); *B60G 2206/72* (2013.01); *B60G 2300/32* (2013.01)

(56) References Cited

U.S. PATENT DOCUMENTS

| | | |
|---|---|---|
| 2007/0029878 A1 | 2/2007 | Gaudreault et al. |
| 2009/0078528 A1 | 3/2009 | Uzawa et al. |
| 2016/0068208 A1* | 3/2016 | Sakamoto .......... B23K 37/0443 269/280 |
| 2019/0359269 A1* | 11/2019 | Hellholm ............. B62D 55/116 |

FOREIGN PATENT DOCUMENTS

| | | |
|---|---|---|
| CN | 104691639 A | 10/2015 |
| DE | 3205127 A1 | 8/1983 |
| JP | 4-297313 A | 10/1992 |
| JP | 3016507 B2 | 3/2000 |
| SE | 390522 B | 12/1976 |
| WO | 2014/182235 A1 | 11/2014 |

OTHER PUBLICATIONS

International Search Report and Written Opinion received for PCT Patent Application No. PCT/SE2018/050179, dated May 18, 2018, 10 pages.
Search Report received for Swedish Patent Application No. 1750316-0, dated Oct. 9, 2017, 2 pages.
Extended European Search Report received for European Application No. 18809825.5, dated Feb. 4, 2021, 10 pages.

* cited by examiner

TRACKED VEHICLE

CROSS REFERENCE TO RELATED APPLICATIONS

This application is a national stage application under 35 U.S.C. § 371 of International Application No. PCT/SE2018/050179, filed internationally on Feb. 26, 2018, which claims priority to SE 1750316-0, filed Mar. 16, 2017.

TECHNICAL FIELD

The present invention relates to a tracked vehicle according to the preamble of claim 1.

BACKGROUND

Tracked vehicles normally comprise a vehicle body and a pair of track assemblies, where each track assembly of the pair of track assemblies comprises a track support beam, a drive wheel, a plurality of support wheels and an endless track running over the drive wheel and said plurality of support wheels. Said drive wheel and said plurality of support wheels are rotatably secured to said track support beam.

In order to improve mobility and comfort of such a tracked vehicle, the vehicle needs to be provided with a suspension device. Said track assembly is hereby arranged to be supported by said vehicle body by means of said suspension device. According to a known tracked vehicle the suspension device comprises a leaf spring element being transversally arranged relative to the longitudinal extension of the vehicle, wherein the leaf spring element is attached to the vehicle body and arranged to run underneath the vehicle body and partly on the respective side of the vehicle body and laterally projecting from each side of the vehicle body and being attached to the track support beam of the left and right track assembly. The tracked vehicle may hereby be provided with a leading such leaf spring element arranged in a front part of the tracked vehicle and a trailing such leaf spring element. Although such U-shaped laterally arranged leaf spring element may provide a robust suspension of the tracked vehicle it results in a weight increase that may affect mobility and efficiency of the tracked vehicle.

There is thus a need to present improvements in suspension devices for tracked vehicles.

OBJECT OF THE INVENTION

An object of the present invention is to provide a tracked vehicle comprising a suspension device which provides a robust construction with good mobility and comfort when driving the vehicle.

SUMMARY OF INVENTION

These and other objects, which will become apparent from the following description, are achieved by a tracked vehicle as set out in the appended independent claim. Preferred embodiments of the tracked vehicle are defined in the appended dependent claims.

Specifically an object of the invention is achieved by a tracked vehicle comprising a vehicle body, at least one track assembly and a suspension device. Said track assembly is arranged to be supported by said vehicle body by means of said suspension device. Said track assembly comprises a track support beam for supporting a plurality of road wheels, an endless track being disposed around said road wheels. Said suspension device comprises a leaf spring arrangement having portions transversally arranged relative to the longitudinal extension of the vehicle. Said leaf spring arrangement comprises L-shaped leaf spring members, each leaf spring member having a first portion attached to said vehicle body, a second portion attached to said track support beam and a transition portion there between, so that compressive and tensile stresses are located to said transition portion for generating a compressive action in said transition portion.

By thus providing such L-shaped leaf spring members configured and arranged so that compressive and tensile stresses are located to said transition portion for generating a compressive action in said transition portion a robust and weight efficient suspension device is obtained, facilitating efficient drive with good mobility and comfort. By thus providing such L-shaped leaf spring members configured and arranged so that compressive and tensile stresses are located to said transition portion for generating a compressive action in said transition portion instead of having a U-shaped leaf spring arranged to run underneath the vehicle body and partly on the respective side of the vehicle body and laterally projecting from each side of the vehicle body and thus having double bending portions/transitions, laminated multilayer leaf spring members, e.g. made of composite material, may advantageously be used without the risk of delamination.

According to an embodiment of the tracked vehicle said first portion of said L-shaped leaf spring member is arranged to run essentially upwardly from said transition portion and said second portion of said L-shaped leaf spring member is arranged to run essentially transversally relative to the longitudinal extension of the vehicle and outwardly from said transition portion. Hereby leaf springs which may be easy and efficiently attached to the vehicle body and track assembly for robust and weight efficient suspension are obtained.

According to an embodiment of the tracked vehicle, when said second portion of said L-shaped leaf spring member subjected to an upward force from underneath, said compressive action is generated in said transition portion. Hereby laminated multilayer leaf spring members, e.g. made of composite material, may advantageously be used without the risk of delamination.

According to an embodiment of the tracked vehicle said L-shaped leaf spring members are laminated multilayer leaf spring members. Hereby an even more weight efficient suspension device is obtainable.

According to an embodiment of the tracked vehicle said L-shaped leaf spring members are made of composite material. Hereby an even more weight efficient suspension device is obtained as compared to e.g. utilizing steel leaf spring members.

According to an embodiment of the tracked vehicle said L-shaped leaf spring members are made of a steel material. Hereby a robust suspension device is obtained.

According to an embodiment of the tracked vehicle said first portion of said L-shaped leaf spring member and said second portion of said L-shaped leaf spring member forms an angle there between in the range of 45 to 120 degrees. Hereby compressive action is efficiently generated in said transition portion when said second portion of said L-shaped leaf spring member subjected to an upward force from underneath so that laminated multilayer leaf spring members, e.g. made of composite material, advantageously may be used without the risk of delamination

BRIEF DESCRIPTION OF THE DRAWINGS

For a better understanding of the present invention reference is made to the following detailed description when read in conjunction with the accompanying drawings, wherein like reference characters refer to like parts throughout the several views, and in which:

FIG. 3b schematically illustrates a side view of the L-shaped leaf spring member in FIG. 3a;

DETAILED DESCRIPTION OF THE INVENTION

Hereinafter the term "track support beam" refers to a structural element arranged to support ground-engaging means comprising an endless track as well as drive wheel and road wheels.

Hereinafter the term "track assembly" refers to a unit of the tracked vehicle comprising track support beam, drive wheel and road wheels as well as a circumferential endless track, which unit is arranged to comprise ground-engaging means and configured to propel the vehicle and thus form at least part of a drive unit of the tracked vehicle.

Hereinafter the term "track assembly pair" refers to opposite track assemblies of a vehicle unit of the vehicle, one track assembly constituting a right track assembly and the opposite track assembly constituting a left track assembly.

Hereinafter the term "vehicle body" refers to any structure of a vehicle configured to support track assemblies of a tracked vehicle and may comprise or constitute the vehicle chassis. The term "vehicle body" may refer to a vehicle frame, one or more beams or the like.

Figure 1:
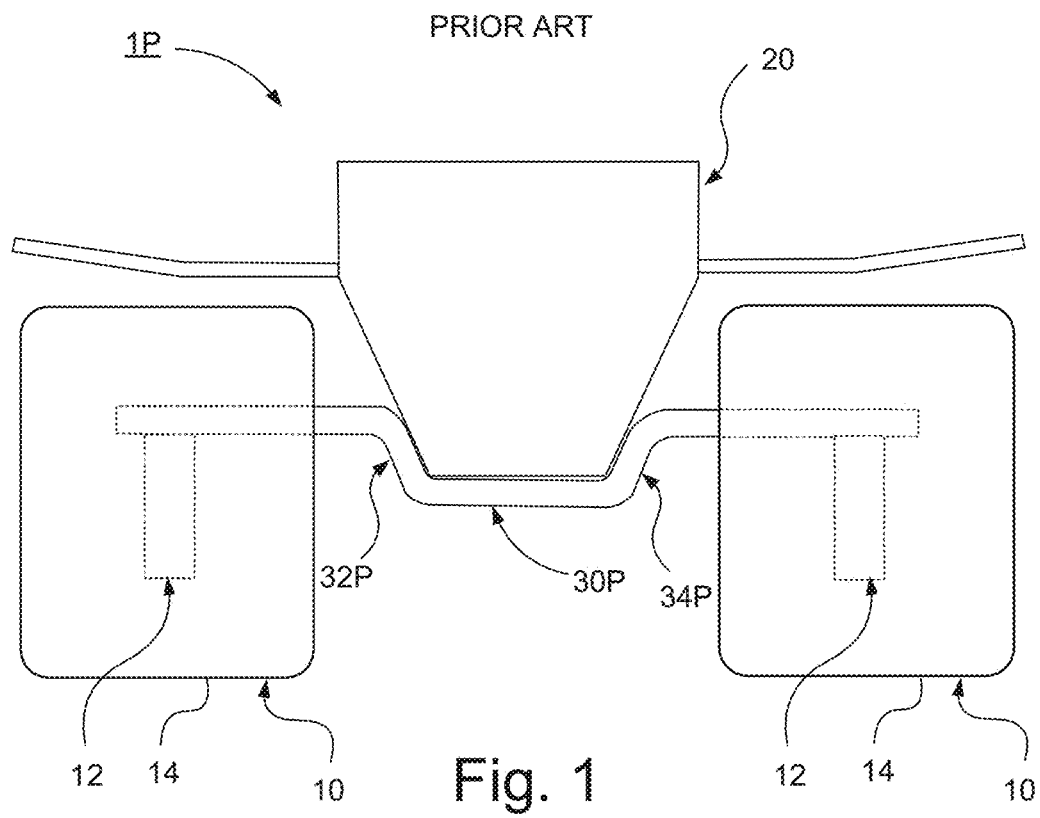
FIG. 1 schematically illustrates a front view of a tracked vehicle with a suspension device according to prior art.

FIG. 1 schematically illustrates a front view of a tracked vehicle V1P with a suspension device according to prior art.

The tracked vehicle V1P comprises a track assembly pair T. Said track assembly pair T comprises two track assemblies 10 arranged on opposite sides of the vehicle V1P. The tracked vehicle V1P comprises a vehicle body 20. The track assembly pair T is connected to said vehicle body 20. Said two track assemblies 10 are thus arranged on opposite sides of the vehicle body 20.

Each track assembly 10 comprises a track support beam 12 for supporting a plurality of road wheels, not shown, an endless track 14 being disposed around said road wheels.

The tracked vehicle V1P comprises a suspension device S for the respective track assembly 10. The respective track assembly 10 of the tracked vehicle is thus arranged to be supported by the respective vehicle body 20 by means of said suspension device.

Said suspension device comprises a leaf spring element 30P being transversally arranged relative to the longitudinal extension of the vehicle V1P. The leaf spring element 30P is attached to the vehicle body 20 and arranged to run underneath the vehicle body 20 and partly on the respective side of the vehicle body 20 and laterally projecting from each side of the vehicle body and being attached to the track support beam 12 of the left and right track assembly 10. The leaf spring element 30P thus has a U-shape having double bending portions/transitions 32P, 34P with double bending portions in connection to the respective side of the vehicle body 20.

Figure 2:
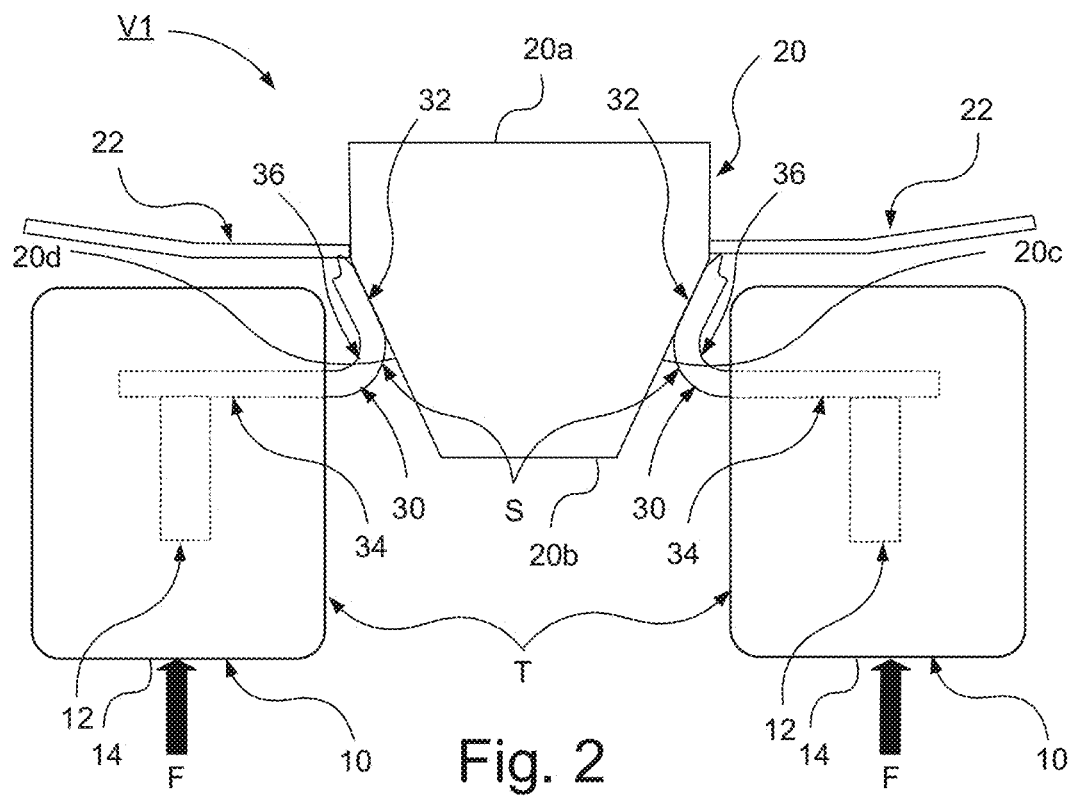
FIG. 2 schematically illustrates a front view of a tracked vehicle with a suspension device according to an embodiment of the invention.

FIG. 2 schematically illustrates a front view of a tracked vehicle V1 with a suspension device S according to an embodiment of the present invention.

The tracked vehicle V1 comprises a track assembly pair T. Said track assembly pair T comprises two track assemblies 10 arranged on opposite sides of the vehicle V1. The tracked vehicle V1 comprises a vehicle body 20. The track assembly pair T is connected to said vehicle body 20. Said two track assemblies 10 are thus arranged on opposite sides of the vehicle body 20.

The vehicle body 20 has an upper side 20a, and underside 20b and a left side portion 20c and right side portion 20d.

Figure 4:
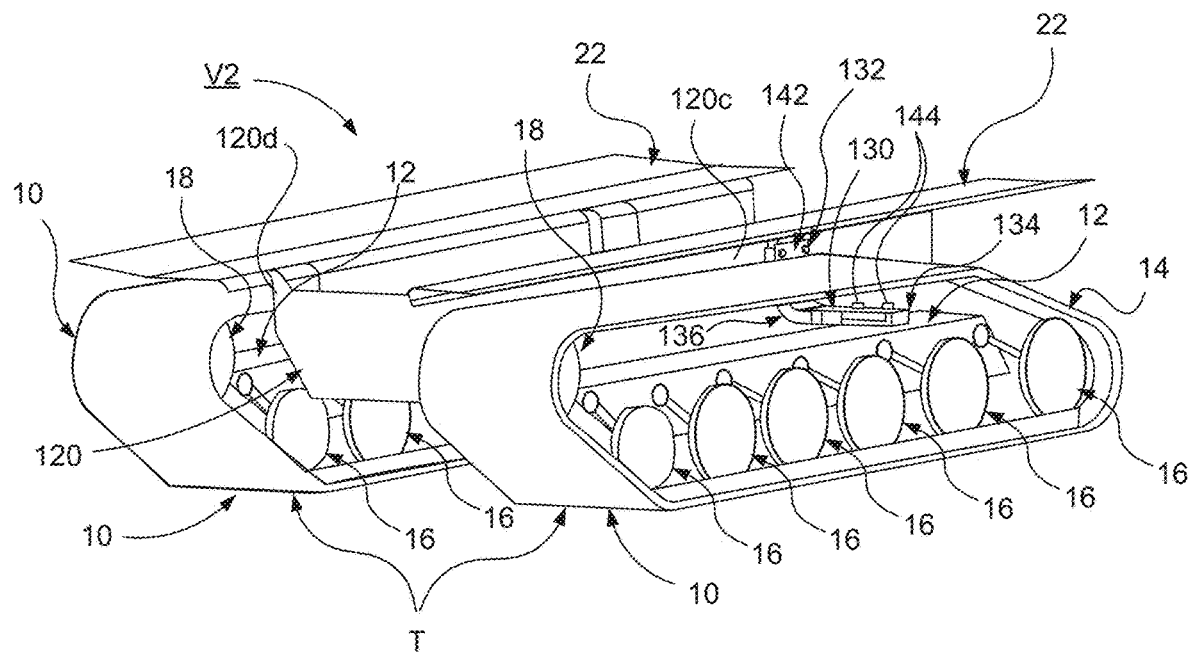
FIG. 4 schematically illustrates a perspective view of a tracked vehicle with a suspension device according to an embodiment of the invention.

Each track assembly 10 comprises a track support beam 12 for supporting a plurality of road wheels and a drive wheel, not shown here, see FIG. 4, an endless track 14 being disposed around said road wheels and drive wheel.

The tracked vehicle V1 comprises a suspension device S for the respective track assembly 10. The respective track assembly 10 of the tracked vehicle is thus arranged to be supported by the respective vehicle body 20 by means of said suspension device S.

Said suspension device S comprises a leaf spring arrangement comprising L-shaped leaf spring members 30 having portions transversally arranged relative to the longitudinal extension of the vehicle. Each L-shaped leaf spring member 30 has a first portion 32 attached to said vehicle body 20, a second portion 34 attached to said track support beam and a transition portion 36 there between. Said first portion 32 of said L-shaped leaf spring member 30 is arranged to run essentially upwardly from said transition portion 36 and said second portion 34 of said L-shaped leaf spring member 30 is arranged to run essentially transversally relative to the longitudinal extension of the vehicle V1 and outwardly from said transition portion 36.

The first portion 32 of an L-shaped leaf spring member 30 arranged on the left side of the vehicle body is thus attached to the left side portion 20c of the vehicle body and the first portion 32 of an L-shaped leaf spring member 30 arranged on the right side of the vehicle body is thus attached to the right side portion 20d of the vehicle body 20.

According to an embodiment the tracked vehicle V1 comprises a pair of leading L-shaped leaf spring members 30 arranged in connection to a front portion of the tracked vehicle V1 on the respective side 20c, 20d of the vehicle body 20 and a pair of trailing L-shaped leaf spring members 30 arranged in connection to a rear portion of the tracked vehicle V1 on the respective side 20c, 20d of the vehicle body 20.

The tracked vehicle V1 comprises support elements 22 arranged to project from the vehicle body 20 above the track assemblies 10 and run along the track assemblies. Said support elements 22 are arranged to provide protection for said track assemblies and support for vehicle cab, not shown.

Said leaf spring arrangement comprises L-shaped leaf spring members 30 where each leaf spring member has a first portion 32 attached to said vehicle body 20, a second portion 34 attached to said track support beam and a transition portion 36 there between, so that compressive and tensile stresses are located to said transition portion 36 for generating a compressive action in said transition portion 36. The respective L-shaped leaf spring member 30 is thus shaped and configured to be attached to the sides 20c, 20d of the vehicle body and the track support beam 12 of the right and left track assembly 10 so that compressive and tensile stresses are located to said transition portion for generating a compressive action in said transition portion. The respective L-shaped leaf spring member 30 is thus shaped and configured to be attached to the sides 20c, 20d of the vehicle body and the track support beam 12 of the right and left track assembly 10 so that, when said second portion 34 of said L-shaped leaf spring member 30 subjected to an upward force F from underneath, said compressive action is generated in said transition portion 36.

According to an embodiment said L-shaped leaf spring members 30 are laminated multilayer leaf spring members.

According to an embodiment of the tracked vehicle said L-shaped leaf spring members 30 are made of composite material.

According to an embodiment of the tracked vehicle said L-shaped leaf spring members 30 are made of a steel material.

Such an L-shaped leaf spring member is described in more detail with reference to FIG. 3a-b.

The exemplified tracked vehicle is according to an embodiment a combat vehicle. The exemplified tracked vehicle may be any suitable tracked vehicle for any suitable purpose.

Figure 3A:
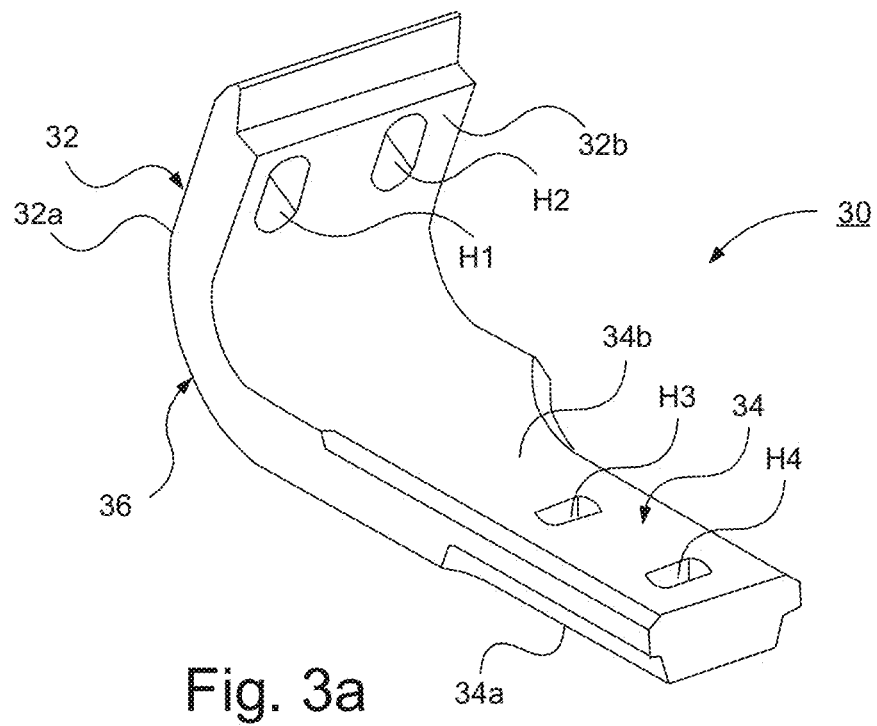
FIG. 3a schematically illustrates a perspective view of an L-shaped leaf spring member of leaf spring arrangement of a suspension device according to an embodiment of the present invention.
Figure 3B:
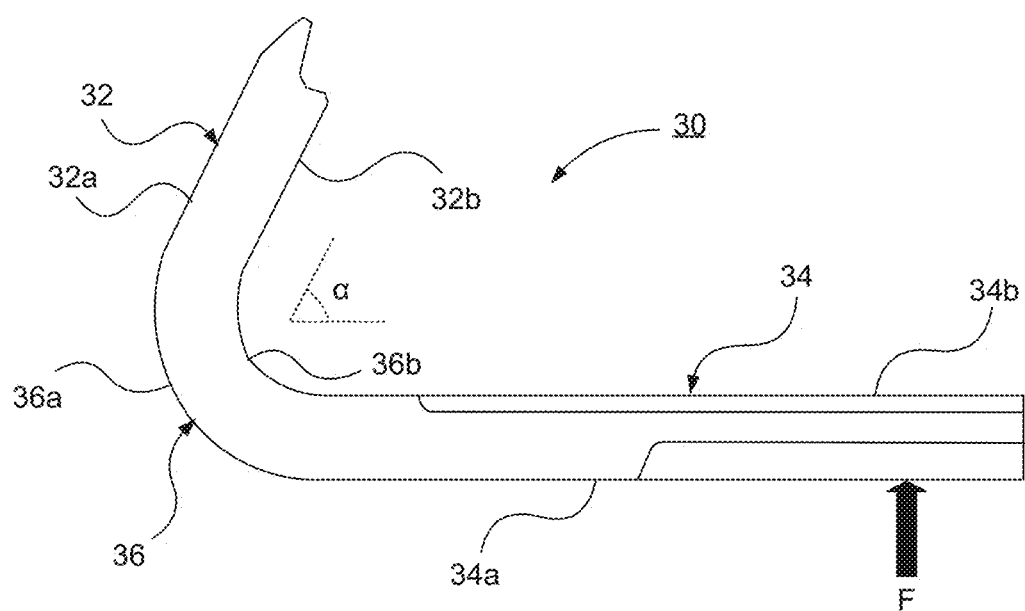

FIG. 3a schematically illustrates a perspective view of an L-shaped leaf spring member 30 of leaf spring arrangement of a suspension device of a tracked vehicle according to an embodiment of the present invention and FIG. 3b schematically illustrates a side view of the L-shaped leaf spring member 30 in FIG. 3a.

The L-shaped leaf spring member 30 has a first portion 32 configured to be attached to a vehicle body of a tracked vehicle, as shown in FIG. 2. The first portion 32 has an attachment side 32a configured to face the vehicle body and an opposite side 32b configured to face away from the vehicle body when attached to the vehicle body as shown in e.g. FIG. 2.

The L-shaped leaf spring member 30 has a second portion 34 configured to be attached to a track support beam of a tracked vehicle, as shown in FIG. 2. The second portion 34 has an attachment side 34a configured to face the track support beam and an opposite side 34b configured to face away from the track support beam when attached to the track support beam as shown in e.g. FIG. 2.

The L-shaped leaf spring member 30 has a transition portion 36 arranged between the first portion 32 and second portion 34.

As shown in FIG. 3a the first portion 32 of the L-shaped leaf spring member 30 comprises through holes H1, H2 for an attachment member, e.g. screw joint members, for facilitating attachment to the vehicle body. The through holes H1, H2 thus run through the first portion 32 from the attachment side 32a to the opposite side 34b. According to the embodiment in FIG. 3a the first portion 32 comprises two through holes H1, H2 arranged next to each other at a lateral distance from each relative to the extension of the first portion 32 on essentially the same level.

As shown in FIG. 3a the second portion 34 of the L-shaped leaf spring member 30 comprises through holes H3, H4 for an attachment member, e.g. screw joint members, for facilitating attachment to the track support beam. The through holes H3, H4 thus run through the second portion 34 from the attachment side 34a to the opposite side 34b. According to the embodiment in FIG. 3a the second portion 34 comprises two through holes H3, H4 arranged next to each other at a longitudinal distance from each relative to the extension of the second portion 34.

As shown in e.g. FIG. 2 said first portion 32 of said L-shaped leaf spring member 30 is arranged to run essentially upwardly from said transition portion 36 and said second portion 34 of said L-shaped leaf spring member 30 is arranged to run essentially transversally relative to the longitudinal extension of the vehicle V1 and outwardly from said transition portion 36. The transition portion 36 has a curved shape with an outer side 36a, see FIG. 3b, arranged to face obliquely downwardly towards the vehicle body 20 and an inner side 36b, see FIG. 3b, arranged to face obliquely upwardly away from the vehicle body 20.

According to the embodiment of L-shaped leaf spring member 30 illustrated in FIGS. 2 and 3a-b the first portion 32 and said second portion 34 of said L-shaped leaf spring member 30 forms an angle of about 60 degrees. The angle formed between the first portion 32 and second portion 34 of said L-shaped leaf spring member depends on the inclination of the side of the respective side of the vehicle body.

FIG. 4 schematically illustrates a perspective view of a tracked vehicle V2 with a suspension device according to an embodiment of the invention.

The tracked vehicle V2 only differs from the tracked vehicle V1 described with reference to FIG. 2 with regard to the vehicle body, i.e. the sides of the vehicle body and hence the respective L-shaped leaf spring, i.e. the angle of the first portion of the L-shaped leaf spring member attached the vehicle body relative to the second portion of the L-shaped leaf spring member.

The tracked vehicle V2 thus comprises a vehicle body 120 with left side 120c and right side 120d. The tracked vehicle V2 thus comprises a track assembly pair T, comprising two track assemblies 10 arranged on opposite sides of the vehicle body 120 of the vehicle V2.

Each track assembly 10 comprises a track support beam 12 for supporting a plurality of road wheels 16 and a drive wheel 18, said endless track 14 being disposed around said road wheels 16 and drive wheel 18.

The tracked vehicle V2 comprises support elements 22 arranged to project from the vehicle body 120 above the track assemblies 10 and run along the track assemblies. Said support elements 22 are arranged to provide protection for said track assemblies and support for vehicle cab, not shown.

The tracked vehicle V2 comprises a suspension device for the respective track assembly 10. The respective track assembly 10 of the tracked vehicle is thus arranged to be supported by the respective vehicle body 120 by means of said suspension device.

Said suspension device comprises a leaf spring arrangement comprising L-shaped leaf spring members 130 of which a left trailing L-shaped leaf spring member 130 is shown in FIG. 4. The L-shaped leaf spring member has portions transversally arranged relative to the longitudinal extension of the vehicle. Each L-shaped leaf spring member 130 has a first portion 132 attached to said vehicle body 120, a second portion 134 attached to said track support beam and a transition portion 136 there between.

The first portion 132 of the L-shaped leaf spring member 130 is configured to be attached to the vehicle body 120 by means of an attachment member 142. Said attachment member 142 comprises according to an embodiment screw joint members.

The second portion 134 of the L-shaped leaf spring member 130 is configured to be attached to the track support beam 12 by means of an attachment member 144. Said attachment member 142 comprises according to an embodiment screw joint members.

Said attachment members 142, 144 and L-shaped leaf spring member 130 are comprised in a leaf spring arrangement 130, 142, 144.

The L-shaped leaf spring member 130 differs from the L-shaped leaf spring member 30 in that the first portion 132 and said second portion 134 of said L-shaped leaf spring member 130 forms an angle of about 90 degrees. The angle formed between the first portion 132 and second portion 134 of said L-shaped leaf spring member depends on the inclination of the respective side 120c, 120d of the vehicle body 120 which for the vehicle V2 has an extension essentially orthogonal to the longitudinal extension and transversal extension of the tracked vehicle V2.

As for the leaf spring arrangement described with reference to FIG. 2, the leaf spring arrangement in this embodiment has essentially the same function, and thus comprises L-shaped leaf spring members 130 where each leaf spring member has a first portion 132 attached to said vehicle body 120, a second portion 134 attached to said track support beam and a transition portion 136 there between, so that compressive and tensile stresses are located to said transition portion 136 for generating a compressive action in said transition portion 136. The respective L-shaped leaf spring member 130 is thus shaped and configured to be attached to the sides 120c, 120d of the vehicle body and the track support beam 12 of the right and left track assembly 10 so that compressive and tensile stresses are located to said transition portion for generating a compressive action in said transition portion. The respective L-shaped leaf spring member 130 is thus shaped and configured to be attached to the sides 120c, 120d of the vehicle body and the track support beam 12 of the right and left track assembly 10 so that, when said second portion 134 of said L-shaped leaf spring member 130 subjected to an upward force from underneath, said compressive action is generated in said transition portion 136.

According to an embodiment said L-shaped leaf spring members 130 are laminated multilayer leaf spring members.

According to an embodiment of the tracked vehicle said L-shaped leaf spring members 130 are made of composite material.

According to an embodiment of the tracked vehicle said L-shaped leaf spring members 130 are made of a steel material.

Such an L-shaped leaf spring member 130 is described in more detail with reference to FIG. 5.

Figure 5:
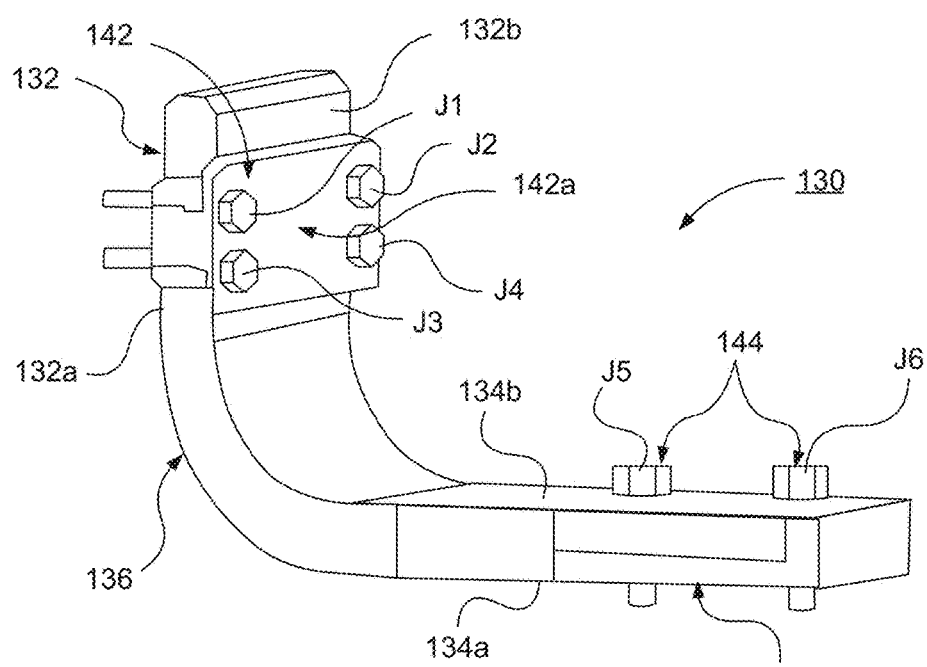
FIG. 5 schematically illustrates a perspective view of an L-shaped leaf spring member of leaf spring arrangement of a suspension device according to an embodiment of the present invention.

FIG. 5 schematically illustrates a perspective view of an L-shaped leaf spring member 130 of leaf spring arrangement of a suspension device according to an embodiment of the present invention.

The L-shaped leaf spring member 130 has a first portion 132 configured to be attached to a vehicle body of a tracked vehicle, as shown in FIG. 4. The first portion 132 has an attachment side 132a configured to face the vehicle body and an opposite side 132b configured to face away from the vehicle body when attached to the vehicle body as shown in e.g. FIG. 2.

The L-shaped leaf spring member 130 has a second portion 134 configured to be attached to a track support beam of a tracked vehicle, as shown in FIG. 4. The second portion 134 has an attachment side 134a configured to face the track support beam and an opposite side 134b configured to face away from the track support beam when attached to the track support beam as shown in e.g. FIG. 2.

The L-shaped leaf spring member 130 has a transition portion 136 arranged between the first portion 132 and second portion 134.

The first portion 132 of the L-shaped leaf spring member 130 is configured to be attached to the vehicle body 120 by means of an attachment member 142. Said attachment member 142 comprises according to this embodiment screw joint members J1, J2, J3, J4, here four screw joint members. Said attachment member 142 comprises according to this embodiment an attachment plate 142a, wherein said screw joint members J1, J2, J3, J4 are configured to attach said first portion 132 to the vehicle body 120 via said attachment plate 142a.

The second portion 134 of the L-shaped leaf spring member 130 is configured to be attached to the track support beam 12 by means of an attachment member 144. Said attachment member 142 comprises according to an embodiment screw joint members J5, J6, here two screw joint members.

As shown in FIG. 4 said first portion 132 of said L-shaped leaf spring member 130 is arranged to run essentially upwardly from said transition portion 136 and said second portion 134 of said L-shaped leaf spring member 130 is arranged to run essentially transversally relative to the longitudinal extension of the vehicle V2 and outwardly from said transition portion 136. The transition portion 136 has a curved shape with an outer side 136a arranged to face obliquely downwardly towards the vehicle body 120 and an inner side 136b arranged to face obliquely upwardly away from the vehicle body 120.

According to the embodiment of L-shaped leaf spring member 130 illustrated in FIGS. 4 and 5 the first portion 132 and the second portion 134 of said L-shaped leaf spring member 130 forms an angle of about 90 degrees. The angle formed between the first portion 132 and second portion 134 of said L-shaped leaf spring member depends on the inclination of the side of the respective side of the vehicle body where the first portion 132 is arranged to be attached.

The foregoing description of the preferred embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated.

The invention claimed is:

1. A tracked vehicle comprising a vehicle body, at least one track assembly and a suspension device, wherein said track assembly is arranged to be supported by said vehicle body by means of said suspension device, said track assembly comprising a track support beam for supporting a plurality of road wheels, an endless track being disposed around said road wheels, said suspension device comprising a leaf spring arrangement having portions transversally arranged relative to the longitudinal extension of the vehicle, wherein said leaf spring arrangement comprises L-shaped leaf spring members, each leaf spring member having a first portion attached to said vehicle body, a second portion attached to said track support beam and a transition portion there between, so that compressive and tensile stresses are located to said transition portion for generating a compressive action in said transition portion.

2. The tracked vehicle according to claim 1, wherein said first portion of said L-shaped leaf spring member is arranged to run essentially upwardly from said transition portion and said second portion of said L-shaped leaf spring member is arranged to run essentially transversally relative to the longitudinal extension of the vehicle and outwardly from said transition portion.

3. The tracked vehicle according to claim 1, wherein, when said second portion of said L-shaped leaf spring member subjected to an upward force from underneath, said compressive action is generated in said transition portion.

4. The tracked vehicle according to claim 1, wherein said L-shaped leaf spring members are laminated multilayer leaf spring members.

5. The tracked vehicle according to claim 1, wherein said L-shaped leaf spring members are made of composite material.

6. The tracked vehicle according to claim 1, wherein said L-shaped leaf spring members are made of a steel material.

7. The tracked vehicle according to claim 1, wherein said first portion of said L-shaped leaf spring member and said second portion of said L-shaped leaf spring member forms an angle there between in the range of 45 to 120 degrees.

\* \* \* \* \*